United States Patent [19]
Rexer
[11] Patent Number: 4,493,473
[45] Date of Patent: Jan. 15, 1985

[54] VALVE ARRANGEMENT

[76] Inventor: Felix Rexer, 109 Lille Rd., Nashua, N.H. 03062

[21] Appl. No.: 569,236
[22] Filed: Jan. 9, 1984

Related U.S. Application Data

[62] Division of Ser. No. 284,477, Jul. 17, 1981.

[51] Int. Cl.[3] .......... F16K 31/124
[52] U.S. Cl. .......... 251/63.4; 251/35; 251/37; 251/42; 251/43
[58] Field of Search .......... 91/396; 251/35, 37, 251/42, 43, 63.4

[56] References Cited

U.S. PATENT DOCUMENTS 2,973,746 3/1961 Jupa .......... 137/625.64 X
3,177,891 4/1965 Reese .......... 251/35 X
3,612,476 10/1971 Leitgeb .......... 251/43 X

FOREIGN PATENT DOCUMENTS 2714410 10/1977 Fed. Rep. of Germany ..... 251/63.4

*Primary Examiner*—Gerald A. Michalsky
*Attorney, Agent, or Firm*—Pearson & Pearson

[57] ABSTRACT

"A poppet valve assembly includes a valving element in the form of a freely slidable poppet, a freely slidable pilot piston having an elongated integral pin extending axially toward the poppet, but unconnected thereto, and an integral elongated spear, with a frusto-conical portion, extending axially in the opposite direction. In a spool valve, the spool is the valving element and has the above elements at each opposite end of the spool, namely a pilot piston with an integral pin unconnected to the spool at the inner end of the pilot piston and an integral spear, with a frustro-conical portion at the outer end of the pilot piston".

5 Claims, 3 Drawing Figures

VALVE ARRANGEMENT

RELATED APPLICATION

This application is a division of my application Ser. No. 284,477 filed July 17, 1981 entitled Valve Arrangement.

BACKGROUND OF THE INVENTION

The invention relates to fluid valve arrangements.

Fluid valves find many industrial uses, for example moving large machinery of one kind or another, raising and lowering loads, etc. A poppet valve may be employed, for example, to control the advance or retraction of a press. Spool valves, for example, may provide for advance and retraction of such apparatus as the table of a grinder or of a press element. In these various cases there may be a way of controlling the valve outlet flow, but often the control is not readily available to the operator at his station, remote from the machine.

One of the problems associated with fluid valving is that the loads should be moved at a desirable speed, but not so rapidly as to create undesirable impacts or collisions, or the like. If the load is moved too slowly, the work is delayed; if moved too rapidly the work is endangered. To control the movement of the load at the desired pace, the flow of the working fluid through the valve must be controlled to the desired flow, neither too rapidly, nor too slowly.

Among United States patents which deal with control of loads by fluid valving are: U.S. Pat. Nos. 3,191,626 to K. W. H. Leibfritz June 29, 1965 for Valve; 3,310,068 to J. R. McGuire et al., Mar. 21, 1967 for Flow Regulator Valves and Hydraulic System; 3,565,115 to Robin K. Beckett et al, Feb. 23, 1971, for Spool Valve; 4,046,165 to Robert C. Rose Sept. 6, 1977, for ValvePositioning Apparatus; and 4,087,967 to Knapp May 9, 1978, for Sleeve Spool Valve.

SUMMARY OF THE INVENTION

A valve has a valving element the equilibrium position of which is to be controlled in order to control the fluid flow between the inlet and outlet port. A piston is provided in a piston chamber having an inlet port and an outlet port, and a spear carried by the piston has a variable cross-section so that as the piston moves in one direction in the chamber the outlet area of the chamber outlet port available for fluid flow is reduced by entry of the spear, and as the piston moves in the other direction, the outlet area of the chamber outlet port available for fluid flow is increased by withdrawal of the spear. The valving element affords one wall of another, second chamber having an inlet port. When fluid pressure is applied to the various inlet ports, the resultant force on the valving element from the second chamber and the force on the piston from the piston chamber through appropriate means, such as a pin carried by the piston, and controlled by the piston position and exerted on the valving element, oppose each other. The valving element reaches an equilibrium position which is, therefore, controlled by the fluid pressure in the piston chamber.

The invention also includes an assembly of cooperating parts which comprise a piston, the spear carried by the piston, a piston cylindrical wall in which the piston may move, an end wall having the piston chamber inlet and outlet ports, and a pin carried by the piston. By using assemblies such as this, an ordinary, known valve may be converted or reconstituted into one embodying the invention.

DESCRIPTION OF THE DRAWING

The various objects, advantages and novel features of the invention will be more fully apparent from the following detailed description when read in connection with the accompanying drawing, in which like reference numerals refer to like parts and in which.

DETAILED DESCRIPTION

Figure 1:
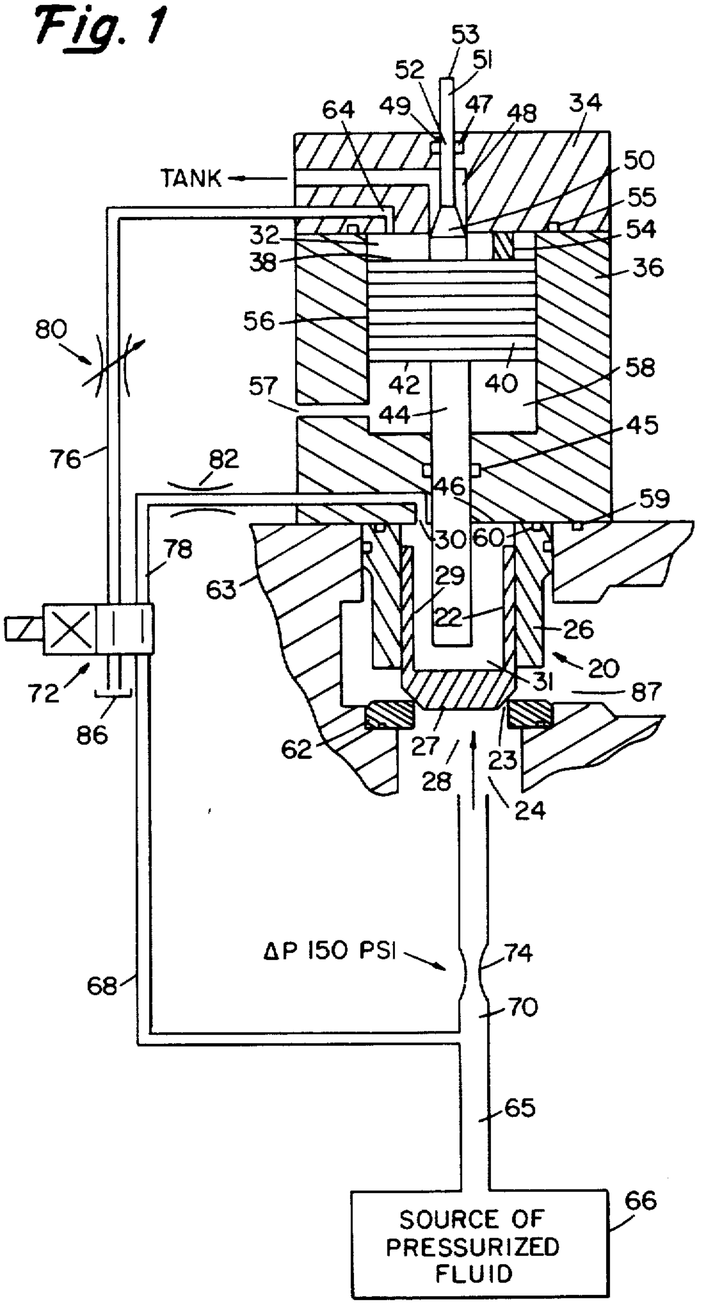
FIG. 1 is a view partially in longitudinal cross-section and partially schematic, embodying the invention as applied to a poppet valve.

The arrangement of FIG. 1 includes a poppet valve 20. The valving element of this valve is a cup-shaped poppet 22 which works in a valving chamber 24 guided by a cylindrical guiding wall 26. The base 27 of the poppet 22 is shown seated on a valve seat 23 to close the inlet port 28 of the valve. When poppet 22 is lifted from the seat 23, communication is provided between inlet port 28 and an outlet port 87 which leads to a load. The cylindrical port 29 of poppet 22 fits into and is guided by the cylindrical wall 26 which forms with the inner portion of the poppet, and an end wall 46, an intermediate chamber 31. A piston chamber 32 is defined by an outer end wall 34, a cylindrical wall 36 and the outer face 38 of a piston 40. The inner face 42 of piston 40 carries a pin 44 which extends in fluid sealed relation by virtue of an O-ring 45 through the inner end wall 46 of the piston chamber 31. The end wall 46 also serves as one end wall of the intermediate chamber 31, so that the pin 44 may contact the inside of the cup base 27 (on the side of base 27 opposite the side closing the inlet port 28) as more fully described hereinafter.

The end wall 34 of the piston chamber has formed in it a port 48 which receives a frustro-conical portion 50 of a spear 52 carried by and extending from the outer face 38 of piston 40 into the port 48, so that as the piston 40 moves in one direction toward the port 48, the frustro-conical portion 50 of the spear advances into the port and diminishes the opening available for fluid flow through the port. As the piston moves in the other direction and withdraws the frustro-conical spear portion 50 from the port 48, the area of the port 48 available for fluid flow is increased.

The area of the annulus between the outer face 38 of piston 40 and the spear 52 at the piston face is preferably equal to the cross-sectional working area of the poppet 22, for a reason which will be apparent hereinafter. The working area determining the force on the poppet at the inlet is the cross-sectional area taken normal to the direction of stroke and which thus determines the force urging the poppet as a result of the fluid pressure on its face, as understood in the art. The cylindrical part 51 of the spear 52 between the frustro-conical portion 50 and the distal end 53 remote from outer piston face 38 passes through the outer end wall 34 in fluid sealed relation, being accommodated through an aperture 49 in the piston end wall 34 and sealed by an O-ring 47. The spear 52 is thus aided and guided in its motion by the circular cylindrical part 51 of the spear 52.

A stop 54 extends from the end wall 34 into piston chamber 32. The end wall 34 may be fastened to the cylindrical portion 36 by any suitable means such as screws (not shown) threaded into the portion 36. An appropriate gasket 55 provides a fluid seal between end wall 34 and cylindrical wall 36. As indicated at 56 there is a fluid sealed relation of the piston 40 against the cylindrical wall 36. A drain port 57 is provided in the compartment 58 formed between pisston face 42, end wall 46, and the cylindrical wall 36. The valve seat 23 by a gasket 62 and the poppet wall 26 by a gasket 60 are respectively fastened in fluid sealed relation to an appropriate valve body 63 for the poppet valve. An inlet port 64 is provided in the piston chamber end wall 34. Gaskets 59 assure a fluid tight seal between end wall 46 and sleeve or cylindrical wall 26.

From the outlet channel 65 of a source 66 of pressurized fluid, channels 68 and 70 lead respectively to a solenoid actuated valve 72 and to the inlet 24 of the poppet valve 20, the channel 70 passing through a pressure reducing orifice 74. When deactivated (the condition illustrated) the solenoid valve 72 connects source fluid channel 68 to a fluid channel 78 which leads through an orifice 82 to the inlet port 30 of the intermediate chamber 31 and connects the drain 86 serving the source 66 to a fluid channel 76 leading through the orifice of a needle valve 80 to the inlet port 64 of the piston chamber 32. When activated as by a signal x to the electrical input leads of the solenoid valve 72, the valve reverses its connections and connects the system drain 86 to the channel 78 and source channel 68 to the channel 76 which leads through the needle valve 80. Outlet port 48 of piston chamber 32, and the outlet port 57 of the relief compartment 58 are connected to the system drain 86.

Operation of Poppet Valve Arrangement

A cycle of operation may commence with the solenoid valve not actuated, in which condition fluid pressure from the fluid line 78 through port 30 into intermediate chamber 31 holds the poppet valve 22 in its closed position, so that there is no flow of working fluid from outlet port 87 to the work load. The piston 40 is held in its up-raised position by pressure in chamber 31, holding the pin 44 away from the poppet base 27.

When an electrical signal x is applied to the terminals of the solenoid valve, system pressure from the source is applied to the piston chamber 32. This pressure, although reduced by the needle valve 80 urges the piston 40 to move downward (as viewed in the drawing) carrying the pin 44 toward and into contact with the poppet base 27. The piston 40 begins to move first, with piston chamber 32 acting as a pilot chamber. The pressure in the pilot piston chamber 32 is related to the degree of opening of the needle valve 80 and the opening of the port 48 available for fluid flow, which is at this time at its greatest opening. Movement of the poppet in response to the pressure applied against it by channel 70 is delayed because of substantial intensified opposing pressure in the intermediate chamber 31 occasioned by the beginning movement of the pin 44 and also the restriction of orifice 82 which does not permit immediate relief of pressure in the intermediate chamber 31 through channel 78 now connected to drain 86. Nevertheless the poppet 22, either after, or shortly before, contact with the end of the pin 44 against the base 27 moves up, remaining in contact with the end of the pin 44 until a static equilibrium is reached. As the piston moves upward the area available for fluid flow through the port 48 is reduced, increasing the pressure in the piston chamber 32. Consequently the equilibrium point is quickly reached in which the downward force on the piston 40, equals the upward force on the poppet 22.

The equilibrium position depends on the setting of the needle valve 80. If the valve is closed a little from an initial setting the pressure in piston chamber 32 falls, the piston 40 will move a little from its initial position toward the outer end wall 34 restricting by entry of spear frustro-conical portion 50 into port 48 the flow from the piston chamber 32, re-establishing equilibrium with the poppet valve 22 open a little farther and admitting a greater flow from port 87 to the load. Thus the fluid flow from the outlet port 87 to the load is slightly enlarged from the initial flow. Conversely if the needle valve 80 opening is enlarged a little from an initial setting, a little less of the pressure drop falls across the needle valve 80, pressure in piston chamber 32 is increased, the piston moves away from end wall 34, increasing the flow from the chamber 32 through orifice 48, reducing the chamber 32 pressure until the force on piston 40 communicated by pin 44 to poppet 22 is again in equilibrium, and the fluid flow to the outlet port 87 is slightly reduced. With equal pressures in piston chamber 32 and on poppet 22 from channel 70, there will be about equal and opposite forces on piston end face 38 and the poppet 22 communicated by the pin 44. This is true because of the equal area of the annulus on piston face 38 described above and the force on the working area of the poppet 22.

Therefore, the needle valve 80 acts as an adjustable flow metering means. The adjustment of the needle valve 80, which may be manually performed, permits easy adjustment of the poppet valve 22 stroke and control of the flow of fluid to the load. The needle valve 80 may be positioned remote from the poppet valve 22 and conveniently to an operator station.

When the solenoid valve 72 is de-energized and the signal x removed, the valve connects the channel 76 to the drain 86 and the channel 78 to the channel 68 from the source 66. The pressure in intermediate chamber 31 now starts to increase toward the pressure of the source 66 in channel 70. Fluid is still flowing through channel 70 and the narrowed orifice 74 which imposes a pressure drop under full flow of about 150 psi. Thus the poppet 22 starts to approach the valve seat 23. At the same time pressure on the pin 44 starts the pin 44 and the piston 40 in a direction to carry the spear 52 toward closure of the port 48 by the frustro-conical portion 50. Even though fluid flow through the poppet valve 20 decreases and, therefore, the pressure in channel 70 on the valve face approaches a static pressure equal to that of the source, the pressure in the intermediate chamber 31 is also approaching a static pressure of the source, notwithstanding orifice 82, because flow there quickly decreases. As the flow in channel 78 decreases more quickly than that in channel 70, because limited by the size of the intermediate chamber 31 which has now no outlet or a much reduced outlet, the valve is seated firmly in the valve seat 23 to close fluid flow to the load. The stop 54 limits the penetration of the spear desirably until the port 48 is substantially closed, leaving the piston chamber 32 ready to react quickly to the increase of pressure in the channel 76 on initiation of the next cycle.

In the needle valve is opened wide, the valve 20 opening on actuation of the switching valve 72 is substantially prevented because on the actuation of the valve, the piston 40 and pin 44 move down to contact the valve poppet 22 before it may move up, and holds the valve poppet in the valve seat 23. If the needle valve is nearly closed, then on actuation of the switching valve 72, the poppet 22 may move up to its uppermost position leaving the valve 20 most open and supplying maximum flow to the load.

Compartment 58 idles during the above-described movements. Its connection to the drain insures that it takes no part in the operation and simply drains any leaking fluid.

Spool Valve Arrangement

Figure 2:
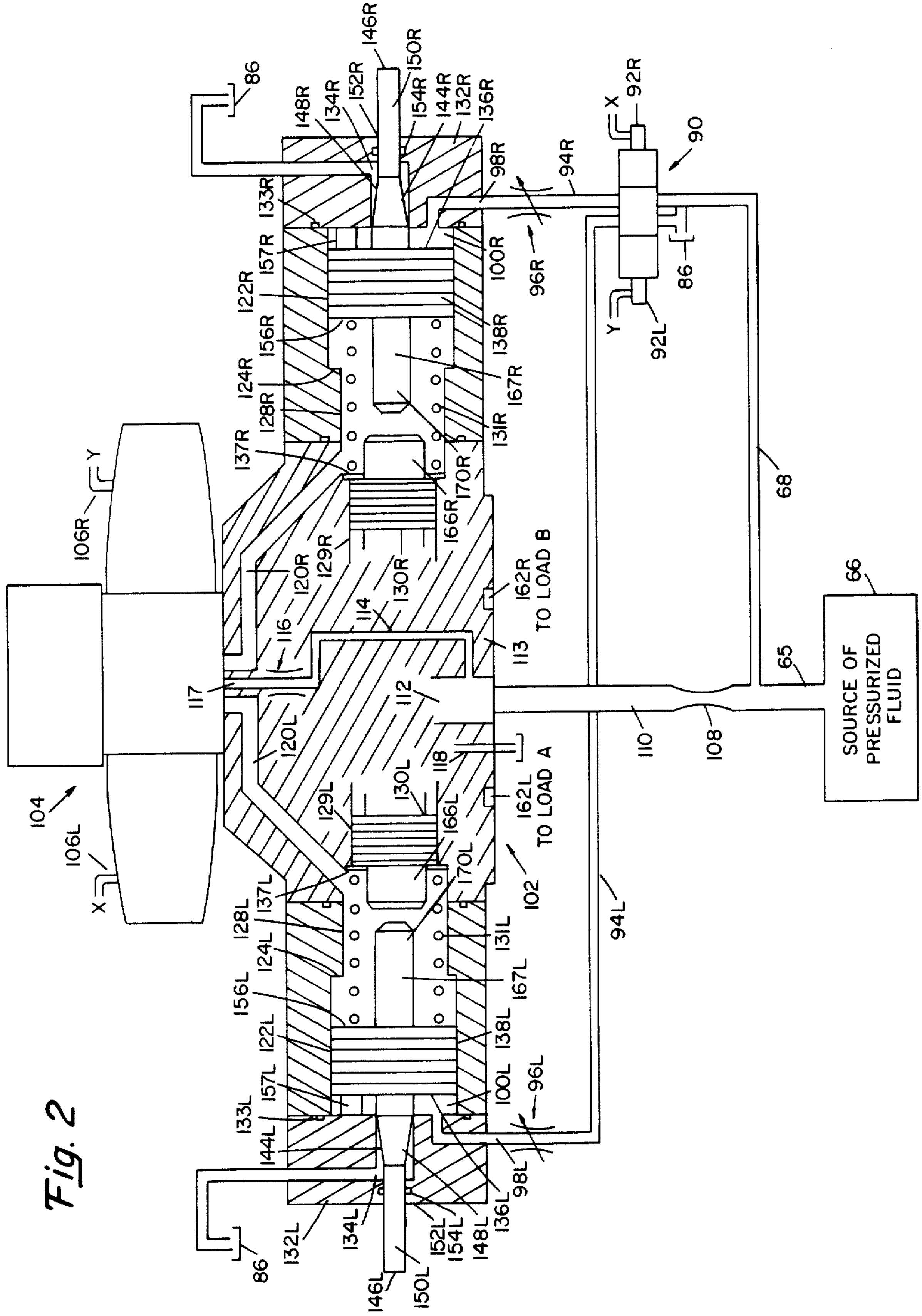
FIG. 2 is a view partially in longitudinal cross-section and partially schematic, embodying the invention as applied to a spool valve.

Referring to FIG. 2, a spool valve arrangement embodying the invention includes a source 66 of pressurized fluid with an outlet channel 65 as in the poppet valve arrangement of FIG. 1, and a branch channel 68, as in FIG. 1, which leads in this case to a double switching valve 90. The switching valve 90 when energized with a signal x at the right hand terminals 92R (as viewed in FIG. 2) of an internal solenoid causes an armature to move thereby connecting channel 68 to a right hand channel 94R; and when a signal y is applied to the left hand terminals 92L of the switching valve 90, an internal solenoid causes an armature to move thereby connecting channel 68 to a left hand channel 94L. When no signal is applied and both solenoid leads 92L and 92R are de-energized, the drain 86 is connected to both right and left channels 94R and 94L. In what follows, description of a part designated by a suffix R implies a like part referenced with the same numeral with a suffix L for a corresponding part on the left.

Channel 94R leads through a needle valve 96R to the inlet port 98R of a piston chamber 100R of a known type of spool valve 102. A pilot valve 104 of a known type is associated with the spool valve 102. The pilot valve 104 has a pair of signal terminals 106R. Terminals 106R and 106L receive respectively the signals y and x. The source channel 65 passes through a pressure reducing orifice 108 to a channel 110 and thence into an internal channel 112 in the body 113 of the spool valve 102. A branch 114 internal to spool valve 102, of channel 112 leads through a constriction 116 and a continuation channel 117, still internal of the valve body 113, into the associated pilot valve 104. Drain 86 is connected to a reservoir.

The signal x applied to the left solenoid leads 106L actuates an armature which by valving actions connected continuation channel 117 to a left pilot passageway 120L and drain channel 118 to a right pilot passageway 120R both internal to the spool valve 102 from suitable outlets of the pilot valve 104. Similarly signal y applied to the right solenoid leads 106R actuates an armature which by valving action connects continuation channel 117 from suitable outlets of pilot valve 104 to a right pilot passageway 120R in valve body 113 and drain channel 118 to the left pilot internal passageway 120L in valve body 113. When neither pairs of terminals 106L and 106R receive signals the pilot valve connects the drain channel 118 to both pilot channels 120L and 120R.

The valve body 113 comprises an outer (being at extreme right) cylindrical wall 122R which has a step or shoulder 124R leading to an intermediate cylindrical wall 128R of slightly reduced diameter, and finally a further, slightly reduced central or inner cylindrical wall 129R continuous with inner cylindrical wall 129L. The cylindrical walls 122R, 128R, and 129R are coaxial and also coaxial with their mirrored walls 122L, 128L, and 129L. A valve element 130 comprises valve spool 130R sealed in fluid sealed relation so that the spool 130R and 130L may reciprocate fluid sealed in the cylindrical inner wall 129R and 129L. Centering springs 131R and 131L retained by retaining rings or washers 137R and 137L aid in centering the spool as will be described hereinafter. Both springs 131L and 131R are shown extended as both pistons 138L and 138R are abutted against stops 157R and 157L. The spool 130R, 130L shifts in known manner within valve body 113, as hereinafter described. The outer cylindrical walls 122L and 122R are coaxially aligned with and on opposte sides of valve body 113, with the intermediate walls 128L and 128R between inner cylindrical walls 129L and 129R respectively also coaxially aligned therewith. All are circularly symmetrical. End wall 132R may be attached by any suitable means, such as screws (not shown) to the cylindrical outer wall 122R and sealed in fluid tight relation by virtue of suitable gaskets 133R. The piston 138R is sealed in fluid by sealed relation against the inner cylindrical wall 122R. End wall 132R has a port 134R leading to drain 86 and has input port 98R already mentioned. A spear 144R extends from the outer piston face 136R towards a distal end 146R. A portion 148R of the spear is frustro-conical so that as the piston 138R moves toward the adjacent end wall 132R, frustro-conical portion 148R enters the port 134R and diminishes the area of the port 134R available for fluid passage; as the piston moves away from adjacent end wall 132R, the frustro-conical portion 148R is withdrawn and the area of the port 134R available for fluid passage is enlarged. Between frustro-conical portion 148R and distal end 146R is a cylindrical part 150R of the spear which extends through a suitable aperture 152R in end wall 132R, and serves to support and guide the spear coaxially with the piston 144R as the piston moves. The cylindrical part 150R is sealed fluid tight in the end wall aperture 152R by a suitable O-ring 154R in the end wall 132R. Part 150R, like part 51, serves as a monitor for verification of proper valve functioning. A stop 157R extends from end wall 132R into piston chamber 100R to stop the piston when the spear portion 148R penetrates port 134R the maximum extent.

The valving element 130 controls by valving action flow from the source 66 and channel 112 to either one of two outlet ports 162L and 162R. When element 130 and its spool part 130L and 130R move left, the corresponding valving port 162L is opened, and fluid from channel 112 flows through the valving 113 internally to corresponding outlet port 162L which may be the same function as those in the known valve of FIG. 3. When element 130 moves right, the corresponding valve port 162R is opened and fluid from channel 112 flows through the valve 113 internally to corresponding outlet port 162R. In each case the degree to which the valving element 130 moves to uncover the port 162L (or 162R) controls the volume of fluid to the corresponding outlet port 162L (or 162R).

The valving element 130 includes a shank 166R at the outer end of spool 130R. The inner face 156R of piston 138R, the cylindrical walls 128R and 122R, (which may be considered as a single cylindrical wall with a shoulder 124R) and the outer end of spool 130R including shank portion 166R define an intermediate chamber 170R between the valving chambers of the spool valve 102 and the outer piston chamber 100R. A pin 167R from the inner face 156R of piston 138R extends into the intermediate chamber 170R for making contact with the shank 166R as a means to communicate, when required, forces between the piston 138R and the valving element 130. The pilot passageway 120R communicates with the intermediate chamber 170R.

Operation of Spool Valve Arrangement

Initially neither electrical signal x nor y is present, and both the pilot valve 104 and the switching valve 90 have neither of their respective solenoids actuated. Accordingly the drain is connected to the channels 94R, 94L. Although fluid pressure is present in the channel or line 110, and is led internally through the internal conduits of the spool valve 102, neither of the ports 162L nor 162R are connected to the source of pressurized fluid 66, the valving element 130 being centered. There is no pressure in the pilot channels 120L, 120R because the pilot valve 104 is de-energized and the drain 118 is connected to these channels 120L, 120R from the internal channels of the pilot valve 104 and valve 102. The springs 131L and 131R are both expanded, and both pistons 138L, 138R abut the stops 157L, 157R respectively. There being no opposing forces the centering springs cause the spool valve element 130 to be centered, blocking both valve ports 162L and 162R from receiving pressurized fluid from channel 112.

Suppose a signal x is now applied to the electrical lines 92R of the switching valve 90 and electrical lines 106L of the pilot valve 104. Pressure is applied directly from the source 66 through the needle valve 96R to piston chamber 100R. At the same time the pilot valve 104 directs pressure from the channel 110 to the left passageway 120L. The right passageway 120R remains connected to the drain 118 via internal connection of the pilot valve 104 and valve 102.

Therefore, pressure is applied to chamber 170L from channel 120L and channel 110 via channel 114, and to chamber 100R from channel 94R. But the orifice 108 imposes a pressure drop of between 100 and 150 psi, and orifice 116 imposes a still further drop. Thus, even though the needle valve 96R is in the line 94R, pressure in the intermediate chamber 170L builds up more slowly than pressure in the piston chamber 100R. Consequently the piston 138R first shifts left, and the pin 167R strikes the shank 166R before the element 130 moves, or perhaps shortly after. Thus the piston chamber 100R acts as a pilot chamber, and the piston 138R moves left perhaps as far as to strike the shoulder 124R, shown in FIG. 2. This opens chamber port 134R as far open as possible for fluid flow because of withdrawal of the frustro-conical portion 148R. Thereupon the pressure in piston chamber 100R begins to decline. Meanwhile the incoming pressure from passageway 120L builds pressure in intermediate chamber 170L which tends to force the valve element 130 to the right. Preferably the annular area exposed between the outer face 136R and the spear 144 has an area substantially equal to the crosssectional, working area of the spool 130L exposed to the pressure in the intermediate chamber 170L. Soon, therefore, the pressure in intermediate chamber 170L becomes greater than that in piston chamber 100R and provides a force greater than the force urging the valve element to the left as communicated by the shank 166R and the pin 167R. Thus the valve element 130 begins to move to the right from the center position shown in FIG. 2. As the frustro-conical portion 148R of the spear 144R enters the port 134R, the pressure in the piston chamber 100R increases. Instantly the frustro-conical portion 148R has sufficiently closed the port 134R that an equilibrium position is reached if the pressure in the piston chamber 100R approximately equals the pressure in the intermediate chamber 170L, the force from piston 138R communicated by means of the pin 167 the opposing forces due to these pressures are equal, but an equilibrium is reached when the various forces, urging the valve element 130 come to an equilibrium.

The equilibrium position of the valve element depends upon the pressure in the piston chamber 100R, which in turn is dependent upon the setting of the needle valve 96R, which provides an adjustable flow metering means. If the needle valve orifice setting is slightly enlarged from some initial setting, the equilibrium position of the spear 144R is a little withdrawn from the port 134R, i.e., a little to the left as viewed in the drawing, in order to compensate for the increase of pressure allowed by the enlarged opening of and increased flow through the needle valve. Moving the valve element to the left from the original equilibrium position slightly decreases the flow from the valving port 162R permitted by the spool valve 130L, thus decreasing the flow of fluid to the load B. No fluid is supplied at this time to load A because the right hand solenoid 106R of the pilot valve 104 is not actuated. The electrical signals x and y are mutually exclusive, thereby causing the channels 120R selectively and alternatively to receive fluid pressure. Under equilibrium when the right piston chamber 100R is receiving fluid from needle valve 96R, the centering springs 131R are about equally compressed to exert about equal and opposing forces on the valve element 130.

If the needle valve 96R is open to its extreme to admit full pressure from the channel 94R, because of the pressure drop created by orifice 108, the pressure applied by the pilot valve 104 into intermediate chamber 170L is substantially less than the pressure in piston chamber 100R. As a result the piston is moved to its extreme left hand position against the shoulder 124R which limits its movement. At the same time the valve port 162R is reduced to a minute opening. On the other hand, if the needle valve 96R opening is sufficiently constricted the port 162R passes maximum system flow to load B. Under equilibrium conditions the centering springs 131R, 131L are each partially compressed, although one may exert a little more force than the other, they do not greatly affect the action.

When electrical signal x is terminated, the pilot valve 104 returns to a neutral position, with neither solenoid thereof actuated; the switching valve 90 is deactivated, with neither solenoid 92L, 92R actuated. The drain is connected to piston chamber 100R via the switching valve 90, and the pressure in the piston chambers thus declines. The centering spring 131R expands and pushes the piston 138R to the right against the stop 157R, and the spool valving element 130 toward its centered position. There at its centered position the valve element 130 is maintained by the equal strength of the expanded centering springs 131L, 131R, until another signal is received by the switching valve 90 and pilot valve 104. The operation when the other, y, signal is received is clear from the foregoing.

By this arrangement an operator can readily and easily control the fluid flow to the two loads A and B to any desired degree when the particular load is selected to receive fluid by signal x or y, by simple adjustment of the respective adjustable flow metering means, the needle valve 96L, 96R. The needle valves are simply arranged to be conveniently located at the operator's position.

Rebuilding a Known Arrangement to Embody the Invention

Figure 3:
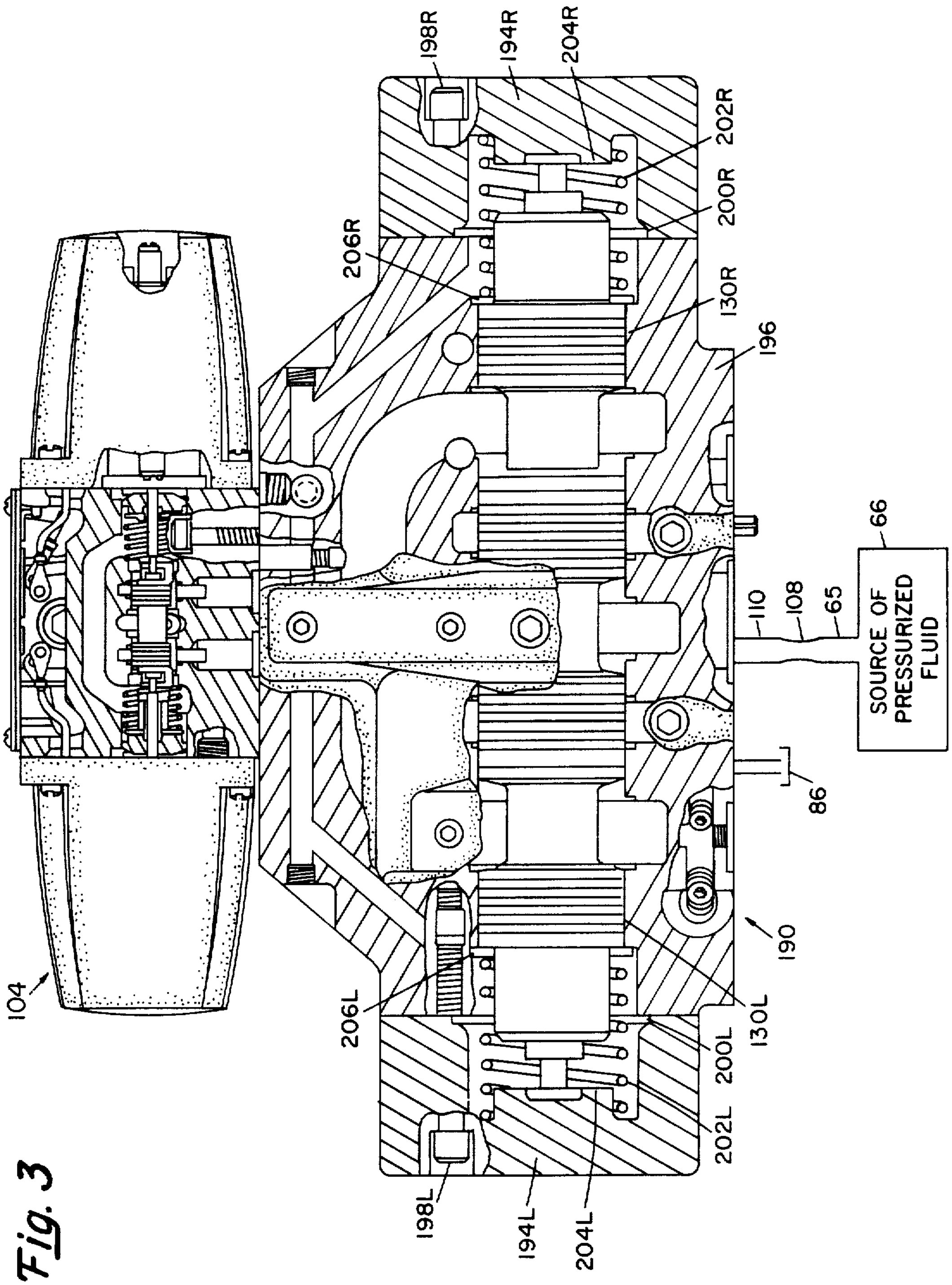
FIG. 3 is a partial, cross-sectional view of a known spool valve, useful in explaining the manner in which the known valve may be reconstituted to embody the invention.

Referring to FIG. 3, there is illustrated a known spool valve 190. The spool element 130 of this known valve may be the same as that of FIG. 2 and terminates on the right hand portion 130R (as viewed in FIG. 3) with a shank 166R. An end block 194R is attached to the body 196 of the valve 190 by screws 198R and maintained in fluid sealed relation by an O-ring 200R. One of the centering springs 202R is received by a suitable central protuberance 204R in an internal cylindrical hollow 206R of the end block 194R. The other end of the centering spring 202R is held by a retainer ring 206R against the spool 130R. This arrangement may utilize the same source 66, channel 65, orifice 108 and channel 110 as illustrated in FIG. 2, leading into the spool valve 190. The known pilot valve 104 may be associated with the spool valve 190.

The arrangement of FIG. 3 may be converted to an arrangement such as illustrated in FIG. 2 to embody the invention by rebuilding the spool valve as follows. Remove the end blocks 194R, and the centering spring 202R. Preferably replace the centering spring 202R by a spring 131R of a little longer stroke. The piston 138R with spear 144R and pin 167R are inserted in place and end wall 132R is attached. Corresponding changes are made with respect to the other, left hand side in FIG. 3. Provide the channel 68 as a suitable branch from channel 65 and provide the switching valve 90 and the channels 94L, 94R and needle valves 96L, 96R connected respectively to the ports 134R, 134L as shown in FIG. 2.

Thus, by using an assembly comprising the cylindrical wall 122R, 128R, the piston 138R and its pin and spear, the end wall 132R, and if desired a centering spring, (and if desired the corresponding parts on the left hand side) a ready conversion from a standard arrangement of FIG. 3 in which is employed a known spool valve and pilot valve may be made into an arrangement such as illustrated in FIG. 2. Although adjustments are possible in the spool valve of FIG. 3, it is a great advantage to be able to exercise control of the outputs of the spool valve by using an arrangement such as that described in connection with FIG. 2, permitting ready control of the spool valve outputs if desired, at the operator's, or other remote, position.

An examination of FIG. 1, will make clear, in view of the explanation of the conversion and rebuilding of the valve of FIG. 3, that a similar rebuilding is possible with a standard poppet valve. For this purpose, the usual spring, used to seat the poppet may be removed, a guide such as guiding poppet wall 26 provided, and a piston chamber and piston with the appropriate ports attached to the valve wall opposite the valve seat. The pin 44 may pass through the aperture used for valve stroke adjustment. The example with respect to FIG. 3 is deemed adequate, nevertheless, to illustrate the principles involved.

Thus, a spool or poppet type valve may be converted or transformed into an inexpensive hydraulically operated remotely controllable combination directional-proportional valve by using a simple sub-assembly for substitution of certain parts of presently known valves.

Conclusion

By using the hydraulic pressure balancing arrangement described above in connection with FIGS. 1, and 2, a high degree of control accuracy and stability is achieved. Excellent repeatability is gained with the control of the orifice of the needle valve. Because large control orifice flow areas are involved, no special fluid filtration is required. A fluid cleanliness level for standard machine tool application is adequate. No delicate parts are involved which require any extraordinary maintenance. In the event of malfunction the parts are easily serviced by persons not highly skilled at low cost. No specialists are required. The principles employed give the valve manufacturer supplier a desirable economic flexibility in furnishing directional controls either with or without the volume control capability as desired by the customer, using either the standard, known valves, or using the alterations by an assembly as suggested above, but with the standard parts employed where possible.

I claim:

1. A poppet valve arrangement comprising:

a poppet valve having a first end wall and a first inlet fluid passageway and a second outlet fluid passageway;

said valve comprising a valving chamber, a poppet mounted in said valving chamber for movement between two extreme positions respectively toward, and away from, said first end wall for respectively opening and closing communication between said fluid passageways, said poppet having a predetermined cross-sectional working area exposed in said valving chamber;

positioning means for controlling the position of said poppet element between its extreme positions to control the volume of fluid flow between said passageways and comprising:

a. a piston having inner and outer faces each on an opposite side thereof;

b. a cylindrical wall receiving the piston in fluid sealed relation for forward and backward motion;

c. an outer end wall, an inner end wall, said outer end wall, said cylindrical wall, and one of said end faces defining a piston chamber, said piston chamber having an outlet port of predetermined area and an inlet port;

d. a spear carried by said piston and extending from said outer piston face, said spear having a portion with an area of its cross section transverse to the piston motion which diminishes with distance from said outer face, so that as said piston moves toward or away from said outer end wall, said portion correspondingly advances into and withdraws from said outlet port and the area of said outlet port available for fluid passage is correspondingly diminished or enlarged;

e. a pin controlled by said piston, normally spaced from said poppet, and fluid sealed from the piston chamber for exerting force on said poppet away from said first end wall, and;

f. means for applying fluid pressure selectively to a passageway of said poppet valve to apply pressure on said poppet.

2. A poppet valve arrangement as claimed in claim 1:

said pin is carried by the piston and extending from the inner face of the piston, said inner end wall having an aperture receiving said pin in fluid sealed relation for contacting the poppet with the end of the pin on the side of the inner end wall remote from the piston for exerting said force.

3. A poppet valve arrangement as claimed in claim 2: said piston, said cylindrical wall, said poppet, said spear and said pin being circularly symmetrical and coaxial, said spear portion being frustro-conical.

4. A poppet valve arrangement as claimed in claim 3, the area of the annulus between said outer piston face and the spear at the face being equal to the cross-sectional, working area of the poppet exposed in the poppet valving chamber, so that equal pressures in said piston chamber and said valving chamber balance the poppet to hold the poppet in an equilibrium position.

5. A poppet valve arrangement as claimed in claim 2, further comprising an adjustable flow metering means to supply a selected volume of fluid flow to the piston chamber inlet port.

* * * * *